(12) United States Patent
Curbow et al.

(10) Patent No.: US 6,694,259 B2
(45) Date of Patent: Feb. 17, 2004

(54) SYSTEM AND METHOD FOR DELIVERING PARKING INFORMATION TO MOTORISTS

(75) Inventors: David Curbow, Sunnyvale, CA (US); Eric Macintosh, Menlo Park, CA (US); Robert St. Pierre, Sunnyvale, CA (US); Stephen Uhler, Los Altos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/982,456

(22) Filed: Oct. 17, 2001

(65) Prior Publication Data

US 2003/0074129 A1 Apr. 17, 2003

(Under 37 CFR 1.47)

(51) Int. Cl.$^7$ .................. G01C 21/26; G01C 21/28; G01C 21/34; G01C 21/36
(52) U.S. Cl. .................. 701/213; 701/200; 701/201; 701/211; 701/202; 701/301; 701/23; 340/468; 340/505; 340/506; 340/687; 340/927; 340/937; 340/942; 382/103; 382/107; 382/209
(58) Field of Search ................. 701/200, 213, 701/202, 209, 201, 211, 301, 23; 340/505, 506, 687, 927, 937, 988, 942, 468, 932.2, 436, 455, 309.15; 382/103, 107, 209; 235/384

(56) References Cited

U.S. PATENT DOCUMENTS

| | | | | |
|---|---|---|---|---|
| 5,432,508 A | * | 7/1995 | Jackson | 340/932.2 |
| 5,980,185 A | * | 11/1999 | Vita | 700/261 |
| 6,107,942 A | * | 8/2000 | Yoo et al. | 700/245 |
| 6,240,365 B1 | * | 5/2001 | Bunn | 701/202 |
| 6,266,609 B1 | * | 7/2001 | Fastenrath | 701/207 |
| 6,340,935 B1 | * | 1/2002 | Hall | 340/932.2 |
| 6,501,391 B1 | * | 12/2002 | Racunas, Jr. | 701/50 |
| 6,507,777 B1 | * | 1/2003 | Pinlam et al. | 701/23 |
| 2002/0099574 A1 | * | 7/2002 | Cahill et al. | 700/245 |

OTHER PUBLICATIONS

Transportation Research Board/National Research Council—Delivering and integrated suite of ITS application for driver assistance and mobile service & information, 1999, Internet, pp. 1–51.*

* cited by examiner

*Primary Examiner*—William A Cuchlinski, Jr.
*Assistant Examiner*—McDieunel Marc

(57) ABSTRACT

A system and method for delivering parking information is disclosed. Embodiments of the present claimed invention utilize video imaging to analyze the availability of parking spaces. More specifically, a computer is used to process video images of a parking location to determine if a parking space is available.

19 Claims, 10 Drawing Sheets

100b

MAP
305

| SPACE | TYPE |
|---|---|
| 1 | COMPACT |
| 2 | COMPACT |
| 3 | COMPACT |
| 4 | COMPACT |
| 5 | FULL-SIZE |
| 6 | FULL-SIZE |
| 7 | FULL-SIZE |
| 8 | HANDICAP |
| 9 | HANDICAP |

IMAGE
301

| SPACE | STATUS |
|---|---|
| 1 | OPEN 501 |
| 2 | FULL 502 |
| 3 | FULL |
| 4 | FULL |
| 5 | OPEN 503 |
| 6 | FULL 504 |
| 7 | OPEN |
| 8 | FULL 505 |
| 9 | OPEN 506 |

FIGURE 6A

| SPACE | DESCRIPTION |
|---|---|
| 1 | "COMPACT SPACE NEAR ELEVATOR" |
| 2 | "COMPACT SPACE NEAR ELEVATOR" |
| 3 | "COMPACT SPACE NEAR ELEVATOR" |
| 4 | "COMPACT SPACE NEAR ELEVATOR" <br> <u>640</u> |
| 5 | "FULL-SIZE SPACE NEAR MONTGOMERY STREET EXIT" |
| 6 | "FULL-SIZE SPACE NEAR MONTGOMERY STREET EXIT" |
| 7 | "FULL-SIZE SPACE NEAR MONTGOMERY STREET EXIT" |
| 8 | "FULL-SIZE SPACE NEAR MONTGOMERY STREET EXIT" |
| 9 | "HANDICAP SPACE NEAR MONTGOMERY STREET EXIT" |

FIGURE 6B

SYSTEM AND METHOD FOR DELIVERING PARKING INFORMATION TO MOTORISTS

FIELD OF THE INVENTION

The present claimed invention relates generally to the field of software for wireless communication systems. More particularly, the present claimed invention relates to image processing, database technology, and filtering software to locate vacant resources such as parking spaces.

BACKGROUND ART

One annoying problem of modern society is finding a parking space in a crowded location. It is frustrating to drive around aimlessly searching for a parking space. This is especially frustrating when late for an appointment, school, business meeting, etc., or parking is only needed for a very short period of time to do an errand. Systems to assist motorists in finding parking spots have been created, but due to high set-up costs and the likelihood of damage, many systems have never been implemented.

Some systems for alerting motorists of available parking spaces exist. Most systems rely on separate sensors positioned at each parking space. One system places a separate receiver and transmitter at each parking space. The availability of a parking space is detected by an interruption of the transmitted signal. Such a system can be inaccurate in many situations. For example, snow, mud or water may cover the transmitters consequently causing inaccurate signals. In addition to inaccuracies, devices placed at individual parking spaces can be easily damaged. For example, vehicle traffic can damage equipment placed on the ground. Installing detection equipment at each parking space can also be prohibitively costly, especially when considering the cost of wiring and other required systems for communicating to a central location.

Another prior art system includes a mechanical mechanism that alerts motorists of an available parking spot. In this system, a flag is raised and lowered depending if the parking spot is occupied or available. The mechanical system takes advantage of the weight of the vehicle to raise and lower the flag. When the spot is empty, the flag is upright to alert a vacancy. When a car enters the parking space, the flag is lowered. As with the other prior art system, the mechanical system is prone to damage caused by vehicular traffic. In addition, the cost to implement in every parking space can be prohibitively high. Furthermore, the driver must be able to see the flag, therefore limiting the range of such information transmission.

Therefore, what is needed is a more convenient, automatic system for conveying parking vacancy information to a motorist looking for a parking space.

SUMMARY OF THE INVENTION

Accordingly, the present claimed invention provides an automatic computer driven system and method for delivering information regarding available parking spaces to motorists. The claimed invention also includes the use of the Internet and wireless communications to deliver parking information to the motorist's vehicle. Additionally, the present claimed invention utilizes technology that makes the implementation of the system less costly than many alternatives.

Embodiments of the present claimed invention utilize computer controlled video imaging to analyze the availability of parking spaces. An image processing system of a computer system compares video images with a database of predetermined known parking spaces to process and determine the location of available parking spaces. The video processor is programmed to automatically recognize or discriminate between a vacant space and a space occupied by an automobile. In one embodiment of the present claimed invention, the type of parking space is also considered. For example, the system has the capability to distinguish between a compact parking space and a full-size parking space. This distinction becomes important considering that the optimization of space for parking in a downtown area is desired. In another embodiment of the present claimed invention, wireless communication is used to deliver information regarding vacant parking spaces to remote motorists.

In one embodiment, the invention uses video cameras with image processing on a server to determine which spaces in a parking lot or structure are empty. The information is stored in a database. Another database contains information about each space, e.g., whether it is a handicap space, a handicap van space, a compact space, a full size space, and perhaps even different pricing based on long term vs. short-term usage.

In this embodiment, when a car drives into a lot, the vehicle can communicate via a wireless protocol (e.g., Bluetooth, or 802.11 wireless Ethernet) its requirements to a server. Those requirements, e.g., handicap space required, are used to filter available spaces database and determine a space to be assigned to the driver. The information can be communicated to the driver over an Internet radio as described in the patent application "Delivering Location-Dependent Services to Automobiles" Ser. No. 09/840,517, filed on Apr. 23, 2001. Additionally, information can be printed on the parking ticket and possibly displayed on a large LCD sign associated with the ticket machine at the entrance of a parking facility.

One advantage of using the Internet radio is that the driver can be given the information in their native language if that was supplied to the server as one of the requirements. One advantage of using image processing is that a single camera can monitor several spaces for much cheaper than using sensors in each space. Once there is a database of available parking spaces other uses can be made of that, for example, parking utilization analysis.

In another embodiment, the location of an available parking space is printed on a ticket and provided to the motorist when entering a parking facility. In other embodiments, parking information can be displayed on a sign or transmitted over radio frequencies to alert motorists of available parking spaces.

In one embodiment, a motorist can communicate (e.g., its current location and identification) with a remote service provider that in turn communicates with certain garages for parking availability information. The parking information can then be communicated to the service provider, filtered, and then wirelessly delivered to the motorist (e.g., to an in-dash computer having GPS functionality). Furthermore, embodiments of the present invention incorporate the use of a global positioning system (GPS) to tailor parking information depending on the location of the motorist.

These and other objects and advantages of the present invention will no doubt become obvious to those of ordinary skill in the art after having read the following detailed description of the preferred embodiments which are illustrated in the various drawing figures.

BRIEF DESCRIPTION OF THE FIGURES

The accompanying drawings, which are incorporated in and form a part of this specification, illustrate embodiments of the invention and, together with the description, serve to explain the principles of the invention:

FIG. 6A is an illustration of entries in a database containing information about particular parking spots and information gathered from video imaging in accordance with an embodiment of the present invention.

FIG. 6B is an exemplary display of parking availability results that can be communicated to the driver (user) in accordance with one embodiment of the present invention.

DETAILED DESCRIPTION OF THE INVENTION

In the following detailed description of the present invention, a method and system for using computer implemented video imaging to automatically locate vacant parking spaces, specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Section 1 Notation and Nomenclature

Some portions of the detailed descriptions (e.g., process 400) that follow are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those that require physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "receiving", "posting", "opening", "sending", "monitoring", "examining" or the like, refer to the action and processes of a computer system (e.g., FIGS. 3A, 3B), or similar electronic computing device, that manipulates and transforms data represented as physical (electronic) quantities within the computer system's registers and memories into other data similarly represented as physical quantities within the computer system memories or registers or other such information storage, transmission or display devices.

Figure 1:
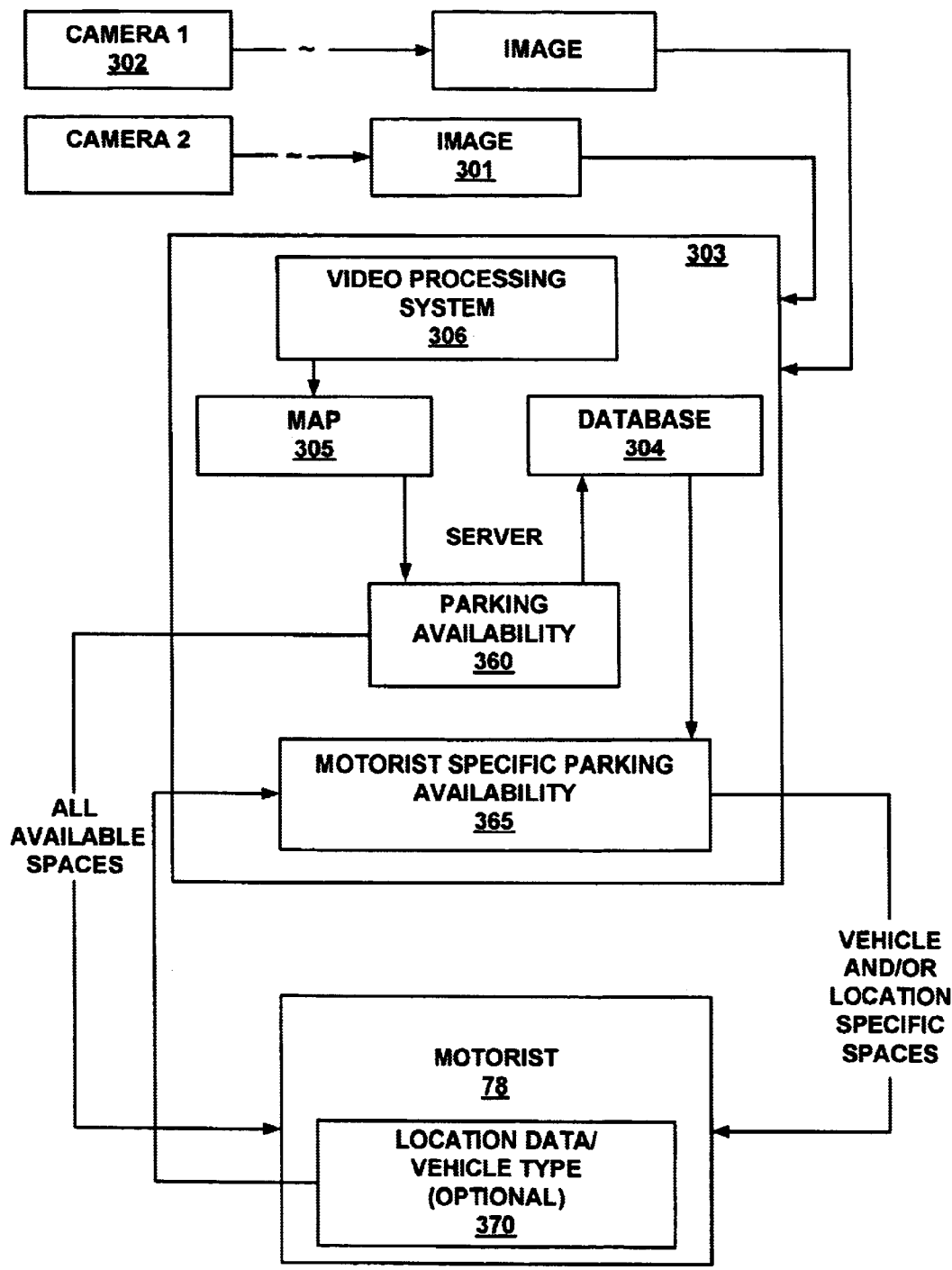
FIG. 1 is logical block diagram of a system that locates vacant parking spaces and transmits the information to a motorist wirelessly in accordance with an embodiment of the present invention.

Section 2 System and Method for Automatically Determining Parking Availability FIG. 1 is a logical block diagram of system 300 that uses video imaging to locate vacant parking spaces or "stalls" in a parking facility. In one embodiment, a video camera 302 is used to capture an image 301 of a predetermined location that contains one or more parking spaces. In one embodiment, the camera 302 captures images from a fixed location. In another embodiment, camera 302 has mobile capabilities and can scan an area in a parking facility. Once camera 302 captures digital image 301, the image is sent to a server 303 for processing. The image 301 may be sent to server 303 wirelessly or over a wired connection. In one embodiment, image 301 is sent to server 303 via the Internet. Many separate cameras can be used that each generate a respective image. Each image has an associated code that identifies the camera that generated it.

The server 303 analyzes each image 301 with a video processing system 306 to determine the location of available parking spaces indicated therein. Each image may cover many parking stalls. Coupled to server 303 is a database 304. Additionally, digital map 305 is stored on the server 303. Map 305 comprises the physical location of the parking spots in a parking facility and in one embodiment, database 304 supplies the type of each parking spot, e.g., compact, handicap, full size, etc. Using video imaging and processing techniques, server 303 can determine if a parking spot is vacant or occupied. If a parking spot is available, map 305 is queried to give the exact location of the parking spot. Based on map 305, the location and type of parking spot is retrieved and provided to the motorist 78. Database 304 can be queried to provide additional information about a particular parking space such as pricing or time allowed for occupancy. In one embodiment, the parking information is transmitted wirelessly to the motorist 78. In another embodiment, the parking information is printed on a ticket and provided to the motorist 78 when entering a parking facility.

In one embodiment, the server system reports all available parking spaces 360. In this embodiment, the motorist can determine the most appropriate space for the vehicle. For example, if a motorist drives a compact vehicle, a compact parking space would be chosen. In another embodiment, location data and or vehicle type information 370 is transmitted to server system 303. In this embodiment, motorist specific parking availability 365 is reported to the motorist.

For example, if the vehicle is a handicap van, the parking system 300 would report an available handicap parking space. Alternatively, only those parking spaces are closest to the motorist are reported.

Figure 2:
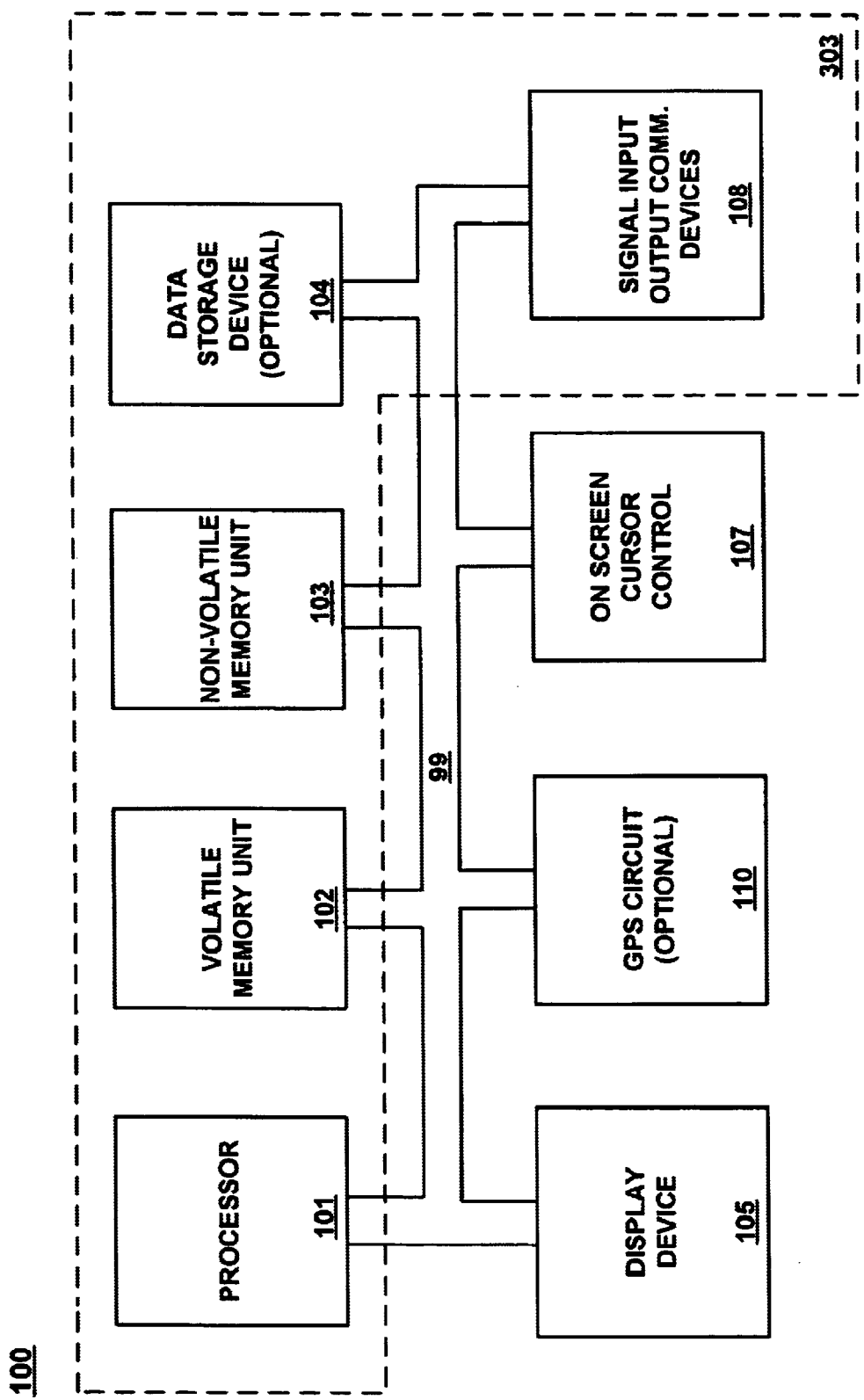
FIG. 2 is a logical block diagram of circuitry located within the exemplary wireless computer system that receives parking information from a remote location and of circuitry located within a server system in accordance with an embodiment of the present invention.

Referring now to FIG. 2, a block diagram of exemplary portable electronic computer system 100 is shown. Computer system 100 includes an address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101. As described above, computer system 100 also contains a display device 105 coupled to bus 99 for displaying information to the computer user. Moreover, computer system 100 also includes a data storage device 104 (e.g., memory stick) for storing information and instructions. System 100 may be an on-board computer system associated with the motorist. Alternatively, system 100 may also represent the elements of server system 303.

Computer system 100 also includes an optional cursor control or directing device 107 coupled to bus 99 for communicating user input information and command selections to central processor 101. In one implementation, device 107 is a touch screen device incorporated with screen 105. In this implementation, device 107 is capable of registering a position on screen 105 where a stylus makes contact. Display device 105 utilized with computer system 100 may be a liquid crystal device (LCD), cathode ray tube (CRT), field emission device (FED, also called flat panel CRT) or other display device suitable for creating graphic images and alphanumeric characters recognizable to the user. In one embodiment, display 105 is a flat panel display. Computer system 100 also includes signal communication interface 108, which is also coupled to bus 99. Communication interface 108 can also include number of wireless communication mechanisms such as infrared or a Bluetooth protocol or a wireless LAN (or IEEE 802.11). In another embodiment (e.g., see FIG. 8), computer system 100 can also include a Global Positioning System (GPS) circuit 110. In one configuration, the location of the motorist may be determined using the GPS system and based on this information, a service provider can determine appropriate parking garages to query for space.

FIG. 2 illustrates a block diagram of an exemplary portable electric device 100, but portions of FIG. 2 can also depict the server computer system 303 (FIG. 1). The components such as address/data bus 99 for communicating information, a central processor 101 coupled with bus 99 for processing information and instructions, a volatile memory unit 102 (e.g., random access memory, static RAM, dynamic RAM, etc.) coupled with bus 99 for storing information and instructions for central processor 101 and a non-volatile memory unit 103 (e.g., read only memory, programmable ROM, flash memory, EPROM, EEPROM, etc.) coupled with bus 99 for storing static information and instructions for processor 101 are components in server system 303 (FIG. 1).

It is appreciated that computer system 100 described herein illustrates an exemplary configuration of an operational platform upon which embodiments of the present invention can be implemented. Nevertheless, other computer systems with differing configurations can also be used in place of computer system 100 within the scope of the present invention.

Figure 3A:
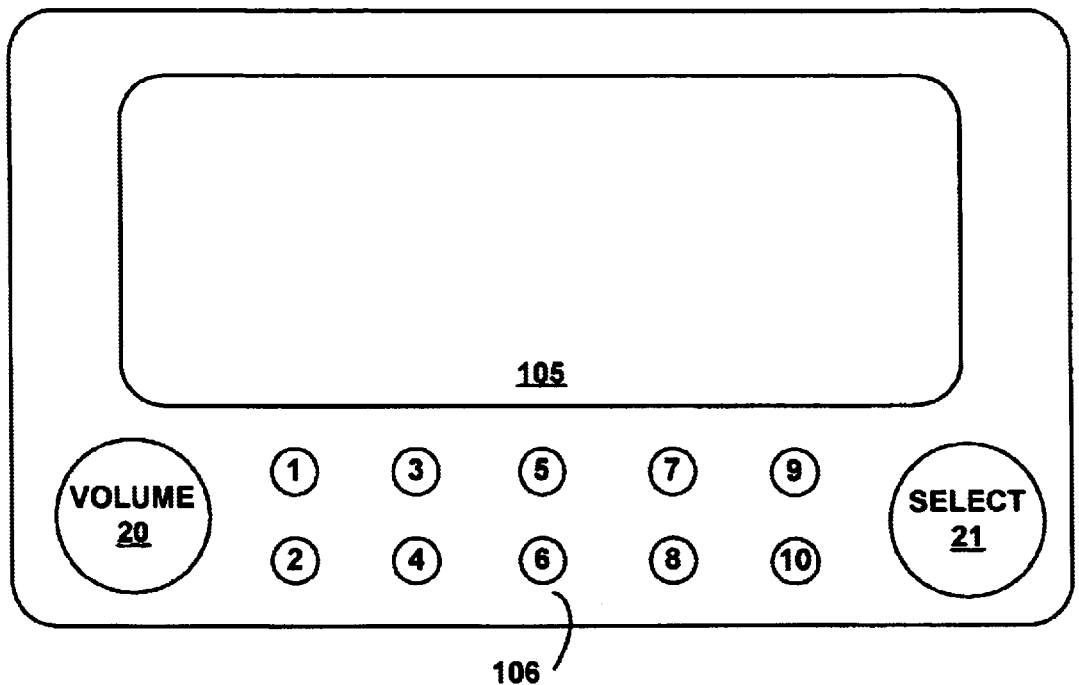
FIG. 3A is an illustration of an Internet radio used with an embodiment of the present invention.

FIG. 3A is an illustration of an electronic device 100 that can be incorporated into one embodiment of the present invention. Electronic device 100 can be installed into a vehicle or can be portable similar to a Personal Digital Assistant. In one embodiment, portable electronic device 100 is wireless and has the capability to connect wirelessly to the Internet. In another embodiment, electronic device 100 is coupled to a global positioning system (GPS). By coupling a GPS system to electronic device 100, the position of the vehicle can be used to deliver location specific parking information to the motorist, e.g., see FIG. 8. In one embodiment, audible directions to a vacant parking space are delivered to the motorist via a speaker system in the vehicle. In another embodiment, electronic device 100 wirelessly transmits the parking requirements of the vehicle to the parking system so that vehicle specific parking information can be provided to the motorist.

Electronic device 100 may have controls such as a volume control 20, select button 21 and function buttons 106. Function buttons 106 can be used for a variety of functions such as a language selector, or for conventional purposes such as radio station pre-set buttons. The select button 21 can be useful when more than one available parking space is reported to the motorist. After a selection has been made, the motorist can request driving directions to the particular parking space by selecting one of the function buttons 106. Furthermore, the volume control 20 can be used to adjust the volume of audible driving directions provided to the motorist as in one embodiment of the present invention.

Figure 3B:
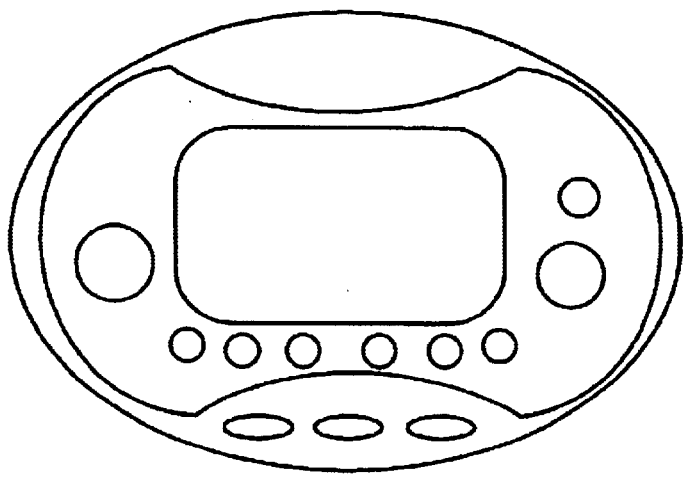
FIG. 3B is one particular exemplary Internet radio, developed by Sun Microsystems, Inc. of Mountain View, Calif., that can be used in one embodiment of the present invention.

Similarly, FIG. 3B is an illustration of an Internet radio in accordance with an embodiment of the present invention. System 300*b*, developed by Sun Microsystems, Inc. of Mountain view, Calif., can be used similarly to portable electronic device 100 as described in FIG. 3A. System 300*b*, the Internet radio, is designed to be installed into the dashboard of a vehicle. The Internet radio 300*b* combines the features of a stereo system with an Internet portal. With the Internet radio, a motorist can receive parking information and directions via the Internet.

Figure 4:
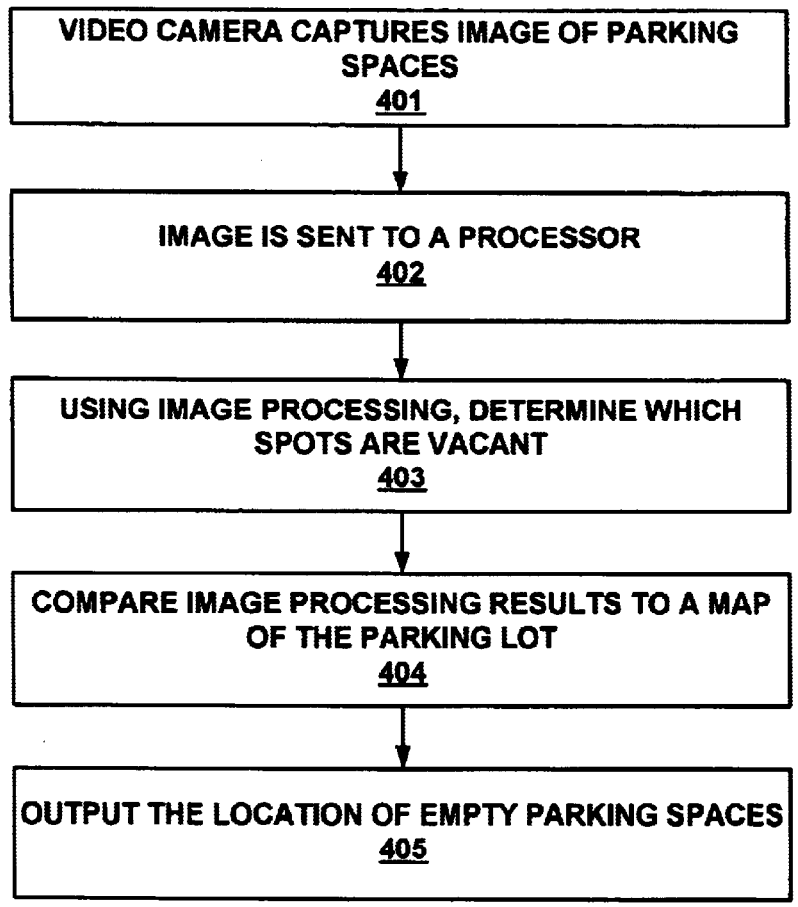
FIG. 4 is a flow diagram of the steps of the system depicted in FIG. 1 in accordance with an embodiment of the present invention.

FIG. 4 is a flow diagram 400 of the steps performed by a server 303 computer to locate vacant parking spaces using video imaging. The first step 401 is to capture an image with a video camera. In this step, one or more cameras capture images of a designated area and digitize the images. In one embodiment, the camera is fixed to capture images of one particular location. In another embodiment, the camera can pan or sweep an area to capture images of different locations. Multiple parking spaces are covered by each digital snap shot. Once an image is captured, the next step 402 is to send the image to the server 303 (FIG. 1) for processing. Many images can be transferred simultaneously as many cameras can be used to capture the different portions of the parking facility. The images can be sent as a .jpg, .gif or any format suitable for sending the images to the server for processing.

The next step 403 is to determine the vacant parking spaces. The imaging software examines the digital images using well known image processing techniques for variance across each image to determine if a vehicle occupies a parking space or not. In one embodiment, a high variance will indicate there is a car in a parking space. A low variance will indicate an empty parking space. The imaging software can examine the image data for a variance in color, shape, texture or any other characteristic suitable to determine the presence of a vehicle in a particular location. Variables such as lighting, weather, or location can alter the techniques used to determine the presence of a vehicle in a parking place.

One program in particular, MATLAB developed by Mathworks of Boston, Mass. can be used by server 303 to accomplish the video imaging needed to determine the occupancy of a parking space. The video imaging can be done with any of the well-known software packages designed to accomplish the task of image differentiation. In one embodiment, the variance in surface characteristics is used to determine the presence of a vehicle in a parking space. Additionally, in another embodiment, an image captures is compares to a previously captured image of the same location with no automobiles in the parking spaces. When the two images are compared, a video imaging software package can determine differences in the images and determine if the parking space is vacant or occupied.

The next step 404 is to compare the results of the video imaging to the map 305 (FIG. 4). Map 305 comprises a layout of the parking area that is observed by the cameras and knows the coverage of each camera. The map 305 can comprise information about each parking space such as location and type. From the information on the map 305, and the results of the image processing, the server can produce a list of the parking spaces available and by correlating the parking images to the camera identification code, the map can report the physical location of each vacant stall. In one embodiment, the list can be further detailed by adding the type of parking space in addition to the location.

The last step 405 is to output the location of vacant parking spaces. The parking information can be delivered to the motorist in a variety of methods as previously described. Methods can include wirelessly delivery of parking information to a portable wireless device in a vehicle, printing parking information on a ticket or displaying the parking information on a display screen. In one embodiment, parking information can be transmitted to the motorist in a variety of languages. For example, foreign travelers can select the language they want the parking information to be in. At step 405, motorist-specific parking information can be relayed to the motorist. For instance, if the motorist is able to communicate its location to the server, then only those spaces closest to the motorist are communicated to the motorist. Alternatively, the motorist's location can be used to generate the driving directions to the vacant stalls. Also, the information may be communicated in a language indicated by the motorist.

In one embodiment, multiple cameras are used to cover a larger area. In this embodiment, each camera is assigned a code corresponding to the location of the image captured. The code associated with the camera is transmitted along with the image data to the server. The server uses the attached code to process the location of the image hence locating the exact location of available parking spaces.

As mentioned above, parking information can be wirelessly transmitted to a portable wireless device. The portable wireless device can resemble a personal digital assistant (PDA) or it can resemble an Internet radio as illustrated in FIGS. 3A and 3B. By incorporating an Internet radio into an automobile, drivers can utilize Internet based resources while driving. In particular, driving directions to a vacant parking space closest to the driver's location can be provided to motorist. Additionally, the motorist can access a list of vacant parking spaces in a particular area.

Figure 5:
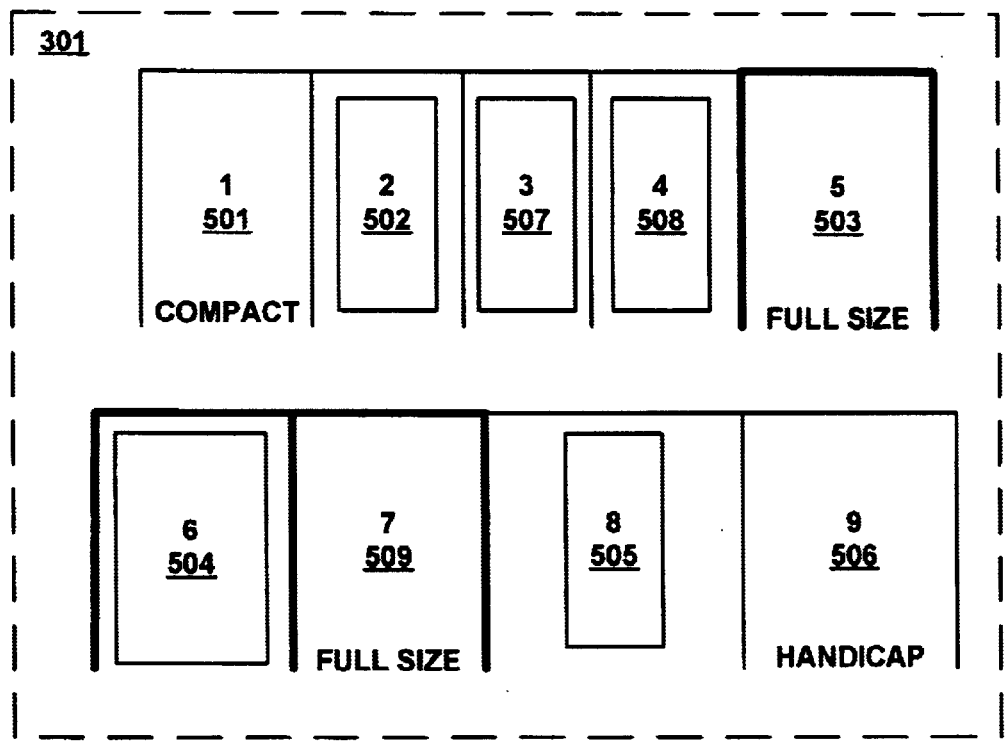
FIG. 5 is an illustration of an exemplary parking lot comprising various types of parking spaces.

FIG. 5 is an illustration of a digital image 301 captured by a video camera 302. Image 301 illustrates two rows of parking places. In the top row, the parking spaces are numbered one through five and in the bottom row, the parking spaces are numbered six through nine. In the top row, compact space one 501 and full size space five 503 are vacant. Conversely, compact spaces two 502, three 507, and four 508 are occupied by vehicles. In the bottom row, full size space six 504 is occupied while full size space seven 509 is vacant. Additionally, handicap space eight 505 is occupied and handicap space nine 506 is vacant. FIG. 5 represents an image that a video camera captures and transmits to a computer for analysis. The number of parking spaces in each image is dependent on the type of image capturing equipment. It also depends if the camera has the ability to pivot and capture a wide range of area. FIG. 5 represents one embodiment of the present invention in which the camera is fixed or can pan over to capture an image of a limited location. The bold lines in FIG. 5 are used for illustrative purposes to distinguish the full size parking spaces from the handicap spaces.

FIG. 6A is an illustration of the digital map 305 that is stored in a database and the image 301 after imaging software has determined if the parking spaces are vacant or occupied. The map 305 and the image 301 may be, in one embodiment, used to report the location of vacant parking spaces. FIG. 6B illustrates another database type that can be used in parallel with the databases of FIG. 6A. The map 305 of FIG. 6A can be retrieved from a look up table that is stored on the database of server 303 (FIG. 1). After the image is captured by the video camera 302 (FIG. 1), imaging software reports a table similar to the image 301 in FIG. 7. Notice in the left-hand column, the parking spaces are numbered and in the right-hand side, the status of the parking space is reported. For example, space one is reported to be open 501 and space two is reported to be full 502.

In one embodiment, the type of parking space is attached to the location of the available space when delivered to the motorist. For example, parking space one is available because in the image 301, the status is "open" and in the map 305, it is determined that parking space one is a compact parking space. The motorist would be notified that there is a compact parking space available in space one. If the motorist needed a handicap space, the motorist would be notified that in space number nine there is an available handicap space. In one embodiment, the type of space required by the motorist is automatically determined with the use of a video camera and a computer system that can estimate the size of the vehicle. In another embodiment, the motorist can select the type of parking space by pushing a button when entering a parking facility. In another embodiment, the type of parking space is selected inside the vehicle and is transmitted wirelessly to the parking system via one of any well-known wireless protocols. In one embodiment, a Bluetooth protocol is used to alert the parking system of what type of parking space is required.

FIG. 6B illustrates another database that can be used by the service to deliver motorist-specific information. This database 640 illustrates spaces and descriptions and can be used to filter out information delivered to the motorist so that only pertinent information is displayed.

Figure 7:
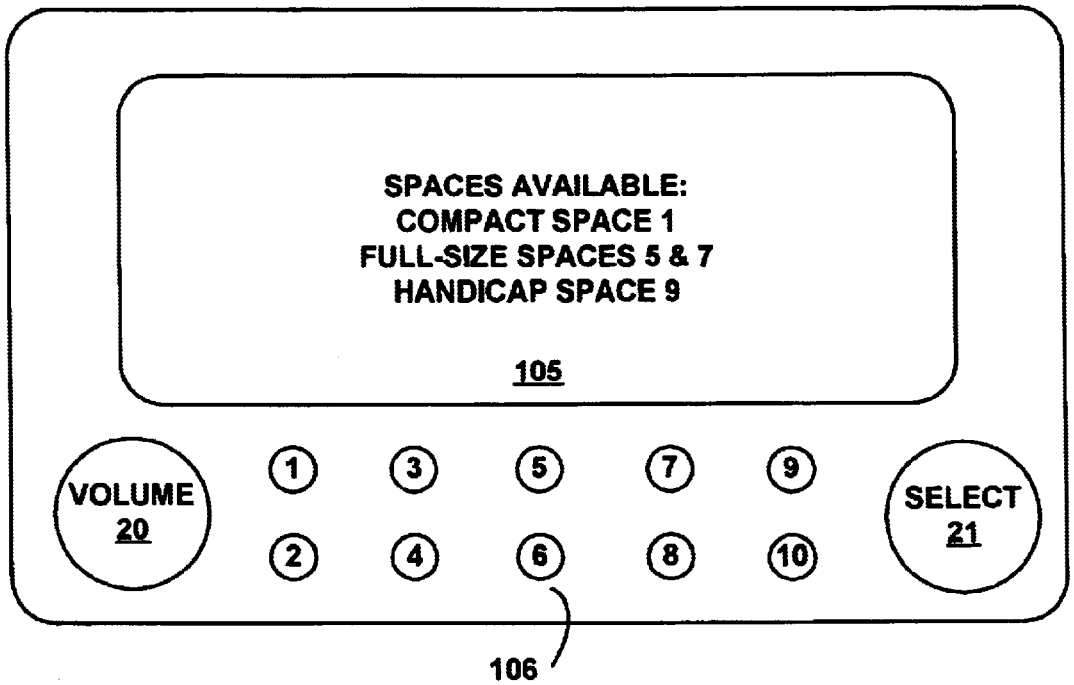
FIG. 7 is an illustration of the wireless computer system of FIG. 3B with parking availability information displayed in accordance with an embodiment of the present invention.

FIG. 7 is an illustration of wireless device 100 displaying parking availability information. Notice display screen 105 contains all types of parking spaces and the relative availability of spaces. For example, display screen 105 alerts the motorist of four available parking spaces in the area. If the vehicle is a compact vehicle, the motorist will choose parking space one. If the vehicle is a full size vehicle, the motorist can choose parking space five or seven. Lastly, if the motorist is handicap, parking space nine is available. As mentioned above, the parking information can be tailored to each vehicle to provide parking availability to accommodate the needs of the particular vehicle. In one embodiment, the motorist can select the parking spot on the display screen 105 using the select button 21.

The report on FIG. 7 can be condensed for display screens that may not be able to present large amounts of information. In this case, step 405 of FIG. 4 contains additional processing such that certain parking availability information is filtered or biased depending on the motorist. In this embodiment, the server can automatically determine which display type is best for the driver and can also perform some filtering to weed out information that may not be pertinent to the driver. The filtering is based on predefined user preferences and attributes. For instance, the service would not show handicapped spaces to a non-handicapped driver. Likewise, the service would not show compact spots for a full sized sedan or SUV, etc. The filtering processes of step 405 of FIG. 4 therefore provide results to the driver that best match the driver's needs and conditions.

Moreover, the service may only offer one possible spot, e.g., the one that is nearest. This means the least driving distance from the current gate location. Or, it may list alternatives, but it may label them with information such as "near elevator," "near Montgomery Street Exit," etc. It is appreciated that some parking structures/lots may require a user to park in an assigned spot, especially if there is no advantage to the user being able to choose between spaces. For example, at the long term lot at the airport, one space is nearly the same as another. An additional database can be included to realize the driver's choice alternatives. An example of such a database is shown in FIG. 6B.

In one embodiment, once a parking space is selected, directions to the parking space can be provided on display screen 105. In another embodiment, once the desired parking space is selected, audible directions are heard via a speaker or the vehicle's stereo system to guide the motorist to the location of the vacant parking space. In another embodiment, electronic device 100 transmits GPS information to the parking system and as a result, parking information for a particular geographic area is returned to electronic device 100. Furthermore, in another embodiment, audible directions are dictated to the motorist by electronic device 100.

It is appreciated that the parking information can be delivered to the motorist without the incorporation of wireless device 100. In one embodiment, parking information is displayed on a sign when entering a parking facility. In another embodiment, parking information is printed on a ticket and given to the motorist when entering the parking facility.

Figure 8:
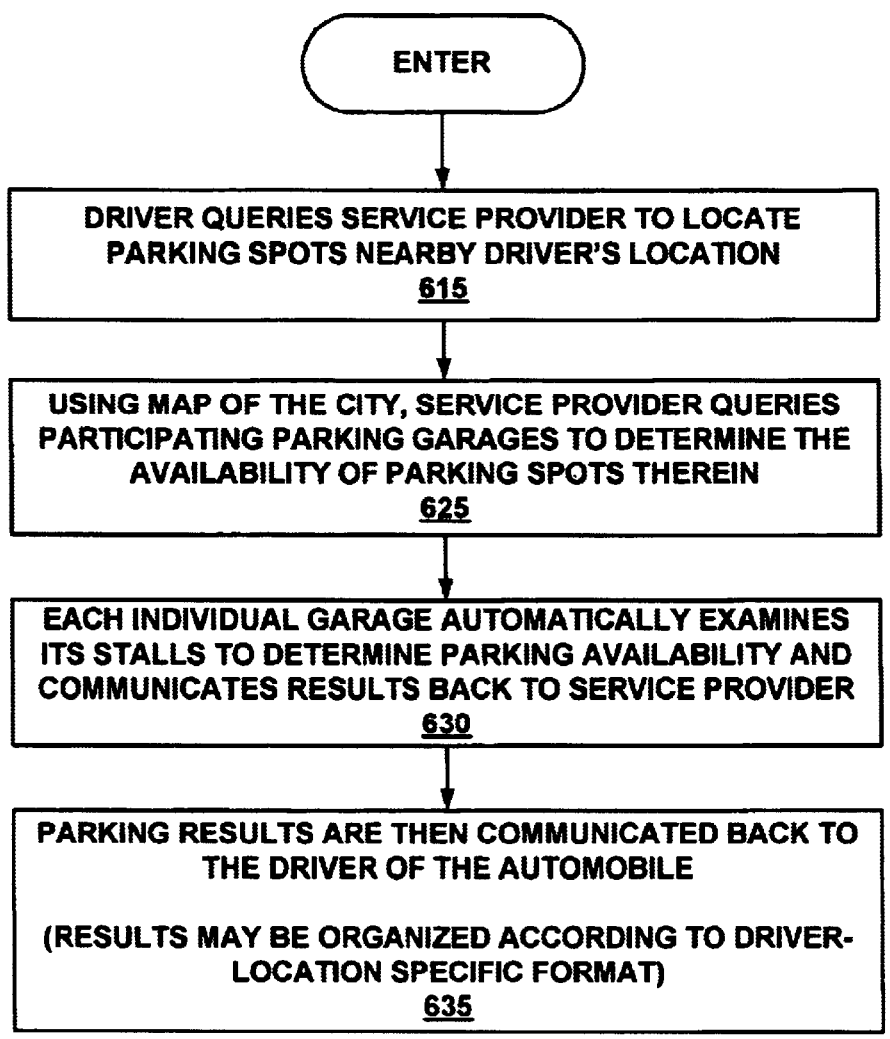
FIG. 8 is a flow diagram of one embodiment of the present invention for a driver to use a wireless service provider to obtain parking availability information.

Section 3 System and Method for Delivering Nearby Parking Availability to a Motorist FIG. 8 illustrates a flow diagram of another embodiment of the present invention. In this process 610, a motorist can use a portable computer system, e.g., in-dash system 100, 100*b* ("Internet radio") to communicate with a remote service provider to automatically obtain parking availability information for nearby parking garages. This embodiment requires a GPS system integrated within the in-dash portable computer system to communicate with the service provider over a wireless communication channel.

At step 615, a motorist driving around the city is allowed to query a service provider, e.g., OnStar, etc., wirelessly, for parking availability information. The query includes the current location of the motorist obtained via the GPS system within the car.

At step 620, using a map of the city and the current location of the motorist, the service provider determines participating (e.g., on the service) nearby parking garages and then queries the nearby garages for parking availability information.

At step 630 of FIG. 8, to obtain the parking availability information, each individual garage can use the automatic determination system as described in Section 2 herein. The results of the parking availability determination are then wirelessly communicated back to the service provider from the participating parking garages. Using some information regarding the driver, e.g., the location or preference information, size of the car, etc., the service provider can bias or filter the results such that they are tailored for the motorist.

At step 635, the service provider communicates the results back to the driver, e.g., using the Internet radio device. The results might be displayed on the computer screen, e.g., FIG. 7 or FIG. 6B. Alternatively, in another embodiment, the results can be delivered to the driver via an audible signal, e.g., via verbal descriptions that are snippets of pre-recorded audio or generated using text to speech. The result might sound like, "[T]here are two parking lots with spaces nearby. The first lot is on Montgomery at first street, while the second lot is at Sacramento and third street. To reach the first one, proceed one half mil to Montgomery and turn left. The lot entrance is three blocks away and located on the left side of the street."

If mapping information is considered, that is by using the GPS information to determine that the car's location is on a freeway with limited exits, another embodiment can bias the results of step 635 and look for parking lots nearest the upcoming exists, instead of directing the user to lots that require driving a long time on surface streets. Therefore, the results can be driver-location specific.

Moreover, in other embodiments, the invention can predict which parking lots would be better for the driver based on driver supplied preferences or attributes. For instance, it could look for lots that give discounts to users of the service, or are closer to a sporting event.

It is appreciated that driver "location" includes direction and speed information in one embodiment. In this embodiment, if the driver is traveling north, then the system may look for spaces in that direction first, rather than requiring the driver to turn around. Having speed information may also aid the service providing in locating garages that are further distanced away.

Embodiments of the present invention, a system and method for delivering information regarding available parking spaces to motorists, have been described. While the present invention has been described in particular embodiments, it should be appreciated that the present invention should not be construed as limited by such embodiments, but rather construed according to the following claims.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A server based method for automatically reporting vacant parking stalls comprising:
   a) accessing a plurality of digital images, each image associated with a portion of a parking facility and each image covering a plurality of parking stalls;
   b) performing computerized image processing on each image to automatically detect vacant parking stalls of said plurality of parking stalls;
   c) indexing a map database with information regarding said vacant parking stalls of each image to determine physical locations of vacant parking stalls of said parking facility;
   d) reporting information regarding a portion of said vacant parking stalls of said parking facility; and
   e) a motorist conveying native language information to said server and wherein said information of d) is reported in a language-specific format based on said native language of said motorist.

2. A method as described in claim 1 wherein said information is driving directions and wherein d) is performed by wirelessly transmitting said driving directions to said motorist directing said motorist to a vacant parking stall.

3. A method as described in claim 1 wherein d) is performed by printing said information on a paper ticket given to said motorist at said parking facility.

4. A method as described in claim 1 further comprising f) a motorist conveying location information to said server and wherein said information of d) is reported in a location-specific format based on said location information of said motorist.

5. A method as described in claim 1 wherein said information of d) is wirelessly transmitted to a mobile computer system of said motorist and further comprising displaying said information on a display screen of said mobile computer system.

6. A method as described in claim 1 wherein said parking stall is located in a parking garage.

7. A method as described in claim 1 wherein said parking stall is on-street parking.

8. A method as described in claim 1 wherein d) is performed using a Bluetooth wireless protocol.

9. A computer system comprising a processor coupled to a bus and a memory coupled to a bus, said memory comprising instructions for executing a method for automatically reporting vacant parking stalls comprising:
   a) accessing a plurality of digital images, each image associated with a portion of a parking facility and each image covering a plurality of parking stalls;
   b) performing computerized image processing on each image to automatically detect vacant parking stalls of said plurality of parking stalls;
   c) indexing a map database with information regarding said vacant parking stalls of each image to determine physical locations of vacant parking stalls of said parking facility;
   d) reporting information regarding a portion of said vacant parking stalls of said parking facility; and
   e) on a remote computer system accessible to a motorist, displaying said information regarding a portion of said vacant parking stalls of said parking facility.

10. A system as described in claim 9 further comprising a plurality of video cameras for capturing said digital images.

11. A system as described in claim 9 further comprising a printer for printing a ticket containing said information regarding said vacant parking stalls of said parking facility.

12. A system as described in claim 9 further comprising a parking type database for reporting a type of said vacant parking stalls of said parking facility.

13. A system as described in claim 9 wherein said type of said vacant parking stalls is compact.

14. A system as described in claim 12 wherein said type of said vacant parking stalls is handicap.

15. A system as described in claim 9 wherein said information regarding said vacant parking stalls of said parking facility is selected based on a known location of a motorist.

16. A computer system comprising a processor coupled to a bus and a memory coupled to a bus, said memory comprising instructions for executing a method for automatically reporting vacant parking stalls comprising:
   a) accessing a plurality of digital images, each image associated with a portion of a parking facility and each image covering a plurality of parking stalls;
   b) performing computerized image processing on each image to automatically detect vacant parking stalls of said plurality of parking stalls;
   c) indexing a map database with information regarding said vacant parking stalls of each image to determine physical locations of vacant parking stalls of said parking facility;
   d) reporting information regarding a portion of said vacant parking stalls of said parking facility to a mobile computer system accessible to a motorist; and
   e) conveying native language information of said motorist to said server and wherein said information of d) is reported in a language-specific format based on said native language of said motorist.

17. A system as described in claim 16 wherein said information is driving directions and wherein d) is performed by wirelessly transmitting said driving directions to said mobile computer system directing said motorist to a vacant parking stall.

18. A system as described in claim 16 further comprising f) conveying location information of said motorist to said server and wherein said information of d) is reported in a location-specific format based on said location information of said motorist.

19. A system as described in claim 16 wherein said information of d) is transmitted wirelessly to said mobile computer system of said motorist and further comprising displaying said information on a display screen of said mobile computer system.

* * * * *

UNITED STATES PATENT AND TRADEMARK OFFICE
CERTIFICATE OF CORRECTION

PATENT NO. : 6,694,259 B2 Page 1 of 1
DATED : February 17, 2004
INVENTOR(S) : David Curbow et al.

It is certified that error appears in the above-identified patent and that said Letters Patent is hereby corrected as shown below:

Title page,
Item [57], delete the abstract as shown and insert the following abstract:
-- A system and method for delivering parking information utilizing video imaging to analyze the availability of parking spaces. Additionally, wireless communication is used to deliver information regarding vacant parking spaces to motorist. --

Column 12,
Line 1, please replace "9" with -- 12 --.

Signed and Sealed this

Twenty-fifth Day of May, 2004

JON W. DUDAS
*Acting Director of the United States Patent and Trademark Office*